(12) United States Patent
Mazany et al.

(10) Patent No.: US 6,969,422 B2
(45) Date of Patent: Nov. 29, 2005

(54) INORGANIC MATRIX COMPOSITION AND COMPOSITES INCORPORATING THE MATRIX COMPOSITION

(75) Inventors: Anthony M. Mazany, Akron, OH (US); John W. Robinson, Fernandina Beach, FL (US); Craig L. Cartwright, Jacksonville, FL (US)

(73) Assignee: Goodrich Corporation, Brecksville, OH (US)

( * ) Notice: Subject to any disclaimer, the term of this patent is extended or adjusted under 35 U.S.C. 154(b) by 433 days.

(21) Appl. No.: 09/871,998

(22) Filed: Jun. 1, 2001

(65) Prior Publication Data

US 2002/0058576 A1 May 16, 2002

Related U.S. Application Data

(60) Provisional application No. 60/233,985, filed on Sep. 20, 2000.

(51) Int. Cl.$^7$ ............................................. C04B 12/04
(52) U.S. Cl. ........................................ 106/600
(58) Field of Search ........................... 106/600

(56) References Cited

U.S. PATENT DOCUMENTS

| | | |
|---|---|---|
| 2,964,415 A | 12/1960 | Payne Jr., et al. |
| 3,933,689 A | 1/1976 | Ray et al. |
| 3,935,018 A | 1/1976 | Ray et al. |
| 3,964,919 A | 6/1976 | Ray et al. |
| 3,989,532 A | 11/1976 | Ray et al. |
| 4,284,664 A | 8/1981 | Rauch, Sr. |
| 4,472,199 A | 9/1984 | Davidovits |
| 4,509,985 A | 4/1985 | Davidovits et al. |
| 4,888,311 A | 12/1989 | Davidovits et al. |
| 4,936,939 A | 6/1990 | Woolum |
| 5,288,321 A | 2/1994 | Davidovits |
| 5,352,427 A | 10/1994 | Davidovits et al. |
| 5,539,140 A | 7/1996 | Davidovits |
| 5,798,307 A | 8/1998 | Davidovits et al. |
| 6,139,619 A * | 10/2000 | Zaretsky et al. ............ 106/629 |
| 6,296,699 B1 * | 10/2001 | Jin et al. .................... 106/814 |

FOREIGN PATENT DOCUMENTS

| | | |
|---|---|---|
| DE | 2 029 701 | 12/1971 |
| DE | 32 46 604 | 6/1984 |

OTHER PUBLICATIONS

Chemical Abstracts, vol. 96, No. 10. Mar. 8, 1982; abstract No. 73730e, "Hardening agent for waterglass" XP000064038.
Chemical Abstracts, vol. 103, No. 12, Sep. 23, 1985, abstract No. 92158d, "Strengthening of soil foundation with neutral grout" XP000064371.

* cited by examiner

*Primary Examiner*—Paul Marcantoni
(74) *Attorney, Agent, or Firm*—Goodrich Corporation

(57) ABSTRACT

A modified alkali silicate composition for forming an inorganic network matrix. The modified alkali silicate matrix is made by reacting an alkali silicate (or its precursors such as an alkali hydroxide, a $SiO_2$ source and water), an acidic inorganic composition, such as a reactive glass, water and optional fillers, additives and processing aids. An inorganic matrix composite can be prepared by applying a slurry of the modified aqueous alkali silicate composition to a reinforcing medium and applying the temperature and pressure necessary to consolidate the desired form. The composite can be shaped by compression molding as well as other known fabrication methods. A notable aspect of the invention is that, although composite and neat resin components prepared from the invention can exhibit excellent dimensional stability to 1000° C. and higher, they can be prepared at the lower temperatures and pressures typical to organic polymer processing.

58 Claims, No Drawings

INORGANIC MATRIX COMPOSITION AND COMPOSITES INCORPORATING THE MATRIX COMPOSITION

CROSS-REFERENCE TO RELATED APPLICATIONS

This application claims the benefit of the filing of U.S. Provisional Patent Application Serial No. 60/233,985, entitled "Inorganic Matrix Compositions and Composites Incorporating the Matrix Composition", filed on Sep. 20, 2000, and the specification thereof is incorporated herein by reference.

BACKGROUND OF THE INVENTION

The present invention relates to inorganic matrix compositions incorporating a silicate network, which can be processed at conditions comparable to those used for typical high-performance organic polymer processing (temperatures ~15° C. to ~200° C. and pressures <200 psi), although a wide range of temperatures and pressures can be employed. The physical and thermal properties of the inorganic matrix binder as well as composites may be enhanced by elevated processing temperatures (up to 400° C. and greater) and pressures (up to 20,000 psi and greater) to produce exceptional composite and neat resin components. The composite materials formed at the lower processing conditions exhibit excellent thermal, dimensional, physical and flameproof properties.

Inorganic matrices are usefull as flame retardant binders, bulk materials, adhesives, cellular materials, such as foamed materials, or composite materials. As bulk materials, they are used to form shaped objects which when cured provide a structural material. As a composite material, the matrix composition is used to impregnate a fabric, which may be combined with other similarly impregnated fabrics, to form the composite lay-up, which is then shaped and cured to form a shaped object, similar to a bulk material, but with the benefit of the reinforcement provided by the fabric.

The basic concept of composite materials has been known for centuries. Composite materials offer a unique blend of value added features, such as weight savings, electrical insulation, thermal insulation, corrosion resistance, and manufacturing cost savings. These features in some instances can overshadow the material cost in specialized applications ranging, for example, from sporting equipment to the F-22 aircraft fuselage. However, current state-of-the-art composite materials can also exhibit properties that present serious barriers to entry in some high-performance markets. These include poor flame, smoke and toxicity (FST) performance, physical degradation at high temperatures as well as higher material and processing costs. When exposed to fire or high temperatures (>500° C.), conventional composite materials can combust and generate toxic smoke and/or gases. The exceptions, such as ceramic matrix composites and metal matrix composites, are too expensive (often more than $500/lb) to gain a significant market presence. Clearly, a market need exists for affordable high temperature-resistant, insulating structures.

The most familiar composite systems today are based on organic polymer matrices such as epoxy/glass fiber, epoxy/carbon fiber, polyurethane/glass fiber, PVC/glass fiber, polyimide/quartz fiber, polyester/glass fiber and nylon/glass fiber. Although organic polymer composites exhibit excellent physical and mechanical properties, they are limited with regard to flammability, smoke and gas generation and elevated service temperatures. The flammability of organic polymer-based composites can be reduced by the addition of inorganic components and/or additives. The substitution of hydrogen atoms with halogen atoms (e.g. chlorine) in hydrocarbons and hydrocarbon polymers can significantly reduce flammability and smoke/gas generation but will degrade at high temperatures (>250° C.) and eventually incinerate at higher temperatures (>450° C.). Organic thermoplastic polymers also deform at relatively low temperatures (~100° C.–300° C.) and organic polymers designed for higher service temperatures are generally prohibitive in material and processing costs.

Other composite materials include metal matrix composites (MMC), ceramic matrix composites (CMC), carbon-carbon composites as well as other inorganic matrix composites. A composite matrix may be 100% inorganic, or it may contain some organic content. Inorganic matrix networks include ceramics, silicates, glasses, aluminum silicates, alkali aluminum silicates, potassium silicates, sodium silicates, silicon carbides, silicon nitrides, alumina, cementitious materials, metals, metal alloys or other matrix materials known to those knowledgeable in the arts. Other materials can be considered include inorganic particles encapsulated with inorganic binders, organic resins filled with inorganic fillers, inorganic-organic hybrids such as silicone, and other inorganic matrix materials known to those knowledgeable in the arts.

A disadvantage of organic polymers is their deficiencies at high temperatures. The use of metals and ceramics raises additional questions with regard to thermal and electrical conductivity, weight limitations, toughness, dielectric properties, ductility, and processing options. Further, ceramics do not lend themselves to the low temperature processing procedures as contrasted with organic polymer processing.

A need exists for noncombustible, temperature-resistant inorganic polymer compounds which process at temperatures and pressures typical for organics (<200° C. and <200 psi) which combines the desirable features of ceramics (non-flammability, resistance to temperatures >450° C.) and organic polymers (low-temperature processing, complex shapes).

Alkali silicates are employed as affordable inorganic matrix binder materials. See for example, U.S. Pat. Nos. 4,472,199; 4,509,985; 4,888,311; 5,288,321; 5,352,427; 5,539,140; or 5,798,307 to Davidovits; U.S. Pat. No. 4,936,939 to Woolum; or U.S. Pat. No. 4,284,664 to Rauch. However, alkali silicates typically possess a very high pH. Thus, these alkali solutions are so caustic that they damage glass fibers, severely degrading strength. Furthermore, cured composite samples prepared in accordance to these disclosures still exhibit a high pH in a solid form. Rauch has disclosed the addition of nonreactive borosilicate glass to an alkali silicate solution, but the glass mentioned is Pyrex, a material that is typically considered inert.

SUMMARY OF THE INVENTION

The present invention is the result of the discovery that an inorganic polymer network can be achieved using a composition that is the reaction product of an alkali silicate, a reactive glass and water. The alkali silicate can be prepared either of two ways:

(1) As the reaction product of an alkali hydroxide or oxide, a silica source and water or
(2) using a commercial or pre-prepared alkali silicate such as Kasil-1 solution, sodium silicate, potassium silicate flake, etc. and combinations thereof. Furthermore, inorganic silicate/glass composites can be achieved using an aqueous slurry of a mixture of an alkali silicate (or its precursors), a reactive glass and water, as well as gel inhibitors and other network forming materials and modifiers.

The thermally resistant inorganic matrix compositions of the present invention incorporate a silicate network and an amorphous phosphate glass network that can be processed within a wide range of temperatures and pressures. A useful feature of this invention is the ability to produce high-temperature resin and composite parts capable of withstanding temperatures of about 1000° C. and are noncombustible. The matrix as well as the composites made from the matrix material exhibit some properties generally restricted to ceramics but are cured at temperatures typical for organic polymer compositions. In addition, the cured matrix composition is not as basic as are most alkali silicate systems but can be formulated to be near neutral with a typical pH below 8.

The addition of a reactive glass, particularly with favorable physical and mechanical properties can yield an unique cured material for high-temperature applications and components. The addition of a solid reactive glass powder to the silicate mixture permits a much higher loading of a non-silicate network and lessens the tendency of the mixture to gel prematurely. The combination of two or more networks within the matrix imparts toughness, a near neutral to neutral pH, enhanced temperature resistance (resin and composites >1000° C.) and hydrolytic stability.

Alkali silicate/glass-based composites can be prepared by applying an aqueous slurry of the modified alkali silicate/glass matrix precursor to a reinforcing medium such as a continuous or discontinuous glass, carbon or other fiber mat. After an optional B-staging period the composite is cured using the appropriate temperature and pressure to consolidate the material into a composite. The term "B-staging" is a common term used in composite technology to describe the practice of allowing a polymer matrix precursor to react and proceed to a partially polymerized intermediate stage short of a fully cured polymer network. Vacuum bagging can also be implemented to aid water removal and consolidation. Compression molding, as well as other typical molding methods, can be used to shape the composite as desired.

The resulting neat resin and/or composite exhibits thermal stability up to 1000° C. and higher, depending upon the formulation and processing and possesses excellent properties with respect to flame, smoke and toxicity. Furthermore, a composite made using the inorganic polymer network forming composition of the present invention is lightweight with good thermal and electrical insulating characteristics. Various shapes are relatively inexpensive to manufacture primarily due to the low temperature and pressures needed to effect cure of the composite.

An alternate composition is a liquid mixture of the alkali base, a silica source, an acidic oxoanionic compound such as phosphoric acid and a multivalent cationic compound such as magnesium nitrate is dried to a friable mass and powdered. The resin powder is combined with the glass powder, formed into usable shape with or without reinforcement, and cured as desired to provide a temperature resistant formulation.

The composition is also useful as adhesive compositions, coatings, neat resins, cellular materials, such as foamed materials, or as a molding compounds. The compositions of the present invention are useful in those applications where good thermal and physical stability are desired, such as those applications for which ceramic composites are used.

DETAILED DESCRIPTION OF THE INVENTION

The inorganic polymer network of the present invention is prepared by reacting an alkali silicate solution, a reactive glass, water and optionally additives such as a clay and/or an oxide filler. Alternately, the reaction of a silica source, alkali base(s), water and a reactive glass can also yield a high-temperature inorganic polymer network. Further, the network can be made by using combinations of materials, such as by using a pre-prepared alkali silicate and supplementing it with an additional silica source and/or an additional alkali source. The composites are made by applying a slurry of an aqueous alkali silicate (or its precursors), a reactive glass (plus any desired additives) and water to a reinforcing medium which can be processed within a wide range of temperatures and pressures. The composite can be shaped by any of the numerous molding methods available prior to curing. The silicate/glass polymer composition can be cured at relatively low temperatures and pressures (i.e., <200° C., and <200 psi) to produce a composite having dimensional and thermal stability to 1000° C. and greater.

The alkali silicates utilized can include a wide range of silica/alkali oxide ($SiO_2/A_2O$) ratios and % solids levels. Such solutions can be purchased from commercial sources or prepared immediately prior to use from precursors such as a silica source and an alkali hydroxide, alkali oxide or carbonate or combination thereof. The alkali silicate can be derived from an alkali base, such as potassium hydroxide or sodium hydroxide, from potash or soda ash and a silica source. The $SiO_2$ source can be an amorphous or crystalline $SiO_2$ form, such as silica, silica fume, precipitated silica, microsilica, sand, microcrystalline silica, silica gels, colloidal silica, quartz, quartz flour, a sodium silicate solution, a potassium silicate solution as well as solid sodium and/or potassium silicates. Various silica sources exhibit desired as well as undesired attributes, for example, some silica fume sources contain traces of carbon that can lead to discoloration in the final product. The thermal and physical properties of the inorganic matrix binder can be influenced by the nature of the silica source, for example, the incorporation of a dense crystalline α-quartz network can enhance dimensional stability while, in turn, introducing an open, amorphous silica source will produce a lower density network.

When the alkali silicate is derived from an alkali hydroxide and a silica source, the alkali hydroxide is present in an amount of about 3 wt. % to about 20 wt. % based upon the weight of the total composition or mixture, preferably about 7 wt. % to about 15 wt. %. The silica source is present in an amount of about 10 wt. % to about 75 wt. %, preferably 15 wt. % to 60 wt. %. The total mixture, in this instance, includes an alkali hydroxide, a silica source, a reactive glass, water, a clay filler and oxide filler. In some cases, for example, when an alkali silicate solution is used, the portion of the alkali hydroxide, silica and water provided is included in the ranges disclosed.

The phrase "reactive glass" encompasses a wide variety of acidic inorganic glasses that can contribute an acid group in the condensation reaction between the alkali silicate and the glass which occurs during the curing step. Reactive acidic glasses are preferred, and examples of reactive acidic glasses include phosphate, borate and borophosphate glasses. There may be reactive glasses which are not truly acidic, but which function in the same manner. A non-acidic glass (pH about 7 to about 10) can be used provided the pH of the reactive glass is less than that of the pH of the alkali silicate component and/or its precursors. Elevated processing conditions may be necessary to consolidate such a composition including higher temperatures (>200° C.) and/or higher pressures (>200 psi). Reactive glasses are different from essentially nonreactive structural glasses as used in beakers and drinking vessels, and optical glasses as used in windows. Reactive glasses are made according to typical glassmaking processes by combining oxide reactants. In the case of an alkali borophosphate glass, $P_2O_5$, $B_2O_3$, and one or more alkali oxides or their precursors are combined in a powder form and heating the mixture to its fusion temperature of about 700° C. to about 1500° C. and then rapidly cooling the melt and optionally annealing the glass to a rigid, friable state. The ratio of phosphoric oxide to alkali metal oxide ($A_2O$) will be about 6.1:1.0 to 1.5:1.0. The glass solid is then pulverized to form a powder.

The reactive glass is preferably in powdered form with reactive borophosphate glass powder being preferred. The thermal and physical properties of the inorganic silicate/glass matrix can be varied by adjusting the ratio of $SiO_2$ to the reactive glass. The G:$SiO_2$ ratio can vary from 0.01 to 50.0 by weight. The reactive glass is used in an amount of between about 0.01% to 60% by weight of the total mixture, with 5% to 35% being preferred, and 10% to 30% by weight being further preferred.

The glass composition before fusion will comprise about 20 mol % to about 80 mol % of phosphorous pentoxide ($P_2O_5$), or its salts, acids, or other precursor forms, which provide the right or equivalent amounts of phosphorous and oxygen based upon the total glass formulation, preferably 30 mol % to 70 mol % with 40 mol % to 60 mol % by weight being further preferred. The boron oxide ($B_2O_3$) will comprise about 1 mol % to 15 mol % of the glass, with 2 mol % to 8 mol % being preferred and 4 mol % to 6 mol % further preferred. The alkali oxide ($A_2O$) comprises about 5 mol % to 50 mol % of the glass composition, with 20 mol % to 40 mol % being preferred, and 15 mol % to 30 mol % further preferred. The alkaline earth oxide (M'O) is used in an amount of between about 0.01 mol % to 30 mol % of the total glass mixture, with 5 mol % to 20 mol % being preferred, and 10 mol % to 15 mol % being further preferred.

Although the invention is the inorganic matrix composition resulting from the reaction of the alkali silica source and the reactive glass powder, the mechanical, physical and processing characteristics of the matrix can be enhanced by the addition of reactive and nonreactive fillers such as metal oxides and clays. These optional components if used in the matrix formulation range from about 2 wt % to about 20 wt %.

The balance of the composition (prior to curing) is water and it will comprise about 15% to 60% by weight based upon the total composition weight. The range of 20% to 50% by weight is preferred, with 25% to 35% by weight further preferred. The water can be contributed as part of one of the components, such as a portion of an alkali silicate solution.

An approximate chemical composition of the invention, i.e., a qualitative representation of the starting materials, which is derived from an aqueous mixture before curing to form the inorganic matrix, can be described as follows:

(1−n)(a$A_2O$:$SiO_2$:gG:f$F_x$)·n$H_2O$

Where:
A=(1−z) $K_2O$ or (z) $Na_2O$, where z can be 0 or 1,
$K_2O$=potassium oxide,
$Na_2O$=sodium oxide,
$SiO_2$=silica, derived from a silica source such as Kasil-1, silica fume, silica, quartz or silica gel, or a combinations thereof, G=a reactive glass such as an alkaliborophosphate glass,
$F_x$=Optional additives and/or additional network former(s), such as one or more, alone or in combination, of the following:
(i) $P_2O_5$ or $SO_3$, derived from acidic precursors such as $H_3PO_4$ or $H_2SO_4$, or combinations thereof,
(ii) secondary network linking unit(s) such as $Mg^{2+}$, $Zn^{2+}$, $Ti^{4+}$ derived from multivalent main group metal and/or transition metal compounds such as $Mg(NO_3)_2$, $ZnCl_2$, or a combination thereof,
(iii) reactive and/or nonreactive fillers such as kaolin, smectites, hormites, mica, vermiculite, metakaolin, metal oxides, or a combination thereof,
(iv) gelation modifiers such as an organic base (quinoline) and/or an organic acid (lactic acid),
(v) surface-active agents such as an anionic, cationic and/or nonionic surfactant such as but not limited to alkylaryl sulfonates, quaternary ammonium salts, protonated organoamine salts, organic-inorganic hybrids such as silicones or combinations thereof,
(vi) organic-based toughening and/or plasticizing agents,
$H_2O$=water,
a=molar ratio of $A_2O$: $SiO_2$ which ranges from 0.05 to 1.00,
g=molar ratio of G: $SiO_2$, which ranges from 0.01 to 50.0,
f=molar ratio of F: $SiO_2$, which ranges from 0.000 to 2.000,
x=0 to about 20 and represents the number of additives (F) used to aid in processing and performance of the basic formulation, and
n=molar ratio of $H_2O$ incorporated into the formulation, where during initial formulation, the range is from 0.10 to 0.90, with n=0.20 to 0.40 being the preferred embodiment, and after cure, n is less than 0.25, with n<0.05 being preferred.

The formulation of the reactive glass is critical to the chemistry and the performance of this invention. It is desired that the glass react with the alkali silicate mixture to reduce the basicity of the resulting matrix and to conjoin multiple networks. The combination of very different networks, one silicate-based and the other phosphate-based results in a blend of an amorphous inorganic polymer and a crystalline network as well as new network units formed by reaction of the basic silicate and the acidic phosphate such as —Si—O—P—. Both silicate and phosphate species are known to be excellent network formers form the basis for this invention.

The glass (G) can be concisely described by the following formula:

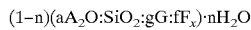
$$\prod_{k=1}^{n}((M^{p+})_{q'}(E^{q-})_{p'})_{r_k} \text{ where } \sum r_k = 1$$

where:
n=number of desired glass components,
M=at least one glass former, such as boron, silicon, phosphorus, sulfur, germanium, arsenic, antimony, aluminum, and vanadium, and at least one glass modifier which functions as a flux, such as lithium, sodium, potassium, rubidium and cesium, and, optionally, additional network modifiers such as vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, and cadmium, E=oxygen, chalcogenides and/or halogens such as sulfur, selenium, tellurium and fluorine, p=cation valence of M, such as 5 for phosphorus, which is generally portrayed as $P^{5+}$ or P(V)), q=anion valence of E such as 2 for oxygen, which is generally portrayed as $O^{2-}$, q'=number of M cations contained in a network unit equal to q or q/2 whichever is the lesser whole number whenever p and q are even numbers, such as 2 for phosphorus in $P_2O_5$ or 1 for silicon in $SiO_2$, p'=number of E anions contained in a network unit equal to p or p/2 whichever is the lesser whole number whenever p and q are even numbers, such as 5 for phosphorus in $P_2O_5$ or 2 for silicon in $SiO_2$, r=molar fraction of each individual network unit in the reactive glass component.

n=number of total network units in the reactive glass component.

A binary glass can be represented by $\{(M_1^{P+})_{q'})(E_1^{q-})_{p'}\}_{r1}\{(M_2^{P+})_{q'})(E_2^{q-})_{p'}\}_{r2}$, $r_1+r_2=1$ and a ternary glass can be generalized as $\{(M_1^{P+})_{q'})(E_1^{q-})_{p'}\}_{r1}\{(M_2^{P+})_{q'})(E_2^{q-})_{p'}\}_{r2}\{(M_3^{P+})_{q'})(E_3^{q-})_{p'}\}_{r3}$, $r_1+r_2+r_3=1$. Thus a soda-lime glass can be described as $(CaO)_{r1}(SiO_2)_{r2}(B_2O_3)_{r3}$ where $r_1+r_2+r_3=1$. Boron (B) and silicon (Si) are glass formers covalently bound to oxygen to yield the glass network. Calcium (Ca) is a glass modifier that ionically bonds to the glass network aiding in the formation of the glassy phase. Therefore M generically represents at least one glass network former ($M_{gf}$) and at least one glass network modifier ($M_{gm}$) in the glass recipe.

The reactive glass can be generalized by the following formula:

$$a(A'_2O)_x b(G_fO)_y c(A''O)_z$$

where A' represents at least one alkali metal glass modifier, which function as fluxing agents, such as lithium, sodium, potassium, rubidium and cesium, $G_f$ represents at least one glass former, such as boron, silicon, phosphorus, sulfur, germanium, arsenic, antimony, aluminum, and vanadium, A" represents, optionally, at least one glass network modifier, such as vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, and cadmium, a represents the number of fluxing agents present and can range from 1 to 5, b represents the number of glass formers present and can range from 1 to 10, c represents the number of glass network modifiers and can range from 0 to about 30, x represents the mole fraction of fluxing agent and is between about 0.050 and about 0.150, y represents the mole fraction of glass former and is between about 0.200 and about 0.950, z represents the mole fraction of glass network modifiers and is between about 0.000 and about 0.500, x+y+z=1, and x<y.

Thus, for a three-component reactive acidic glass containing phosphorus, magnesium, and an alkali metal (A'), the generalized formula is:

$$(A'_2O)_x(P_2O_5)_y(MgO)_z$$

where A' represents a fluxing agent, such as lithium, sodium, potassium, rubidium and cesium, x is between about 0.050 and 0.500, y is between about 0.200 and 0.900, z is between about 0.010 and 0.150, x+y+z=1 and x<y.

Thus for a three-component reactive glass containing phosphorus, lithium and boron, the generalized formula is:

$$(Li_2O)_x(P_2O_5)_{y1}(B_2O_3)_{y2}$$

where x ranges from about 0.050–0.500, y1 ranges from about 0.030–0.800, y2 ranges from about 0.010–0.150, x+y1+y2=1 and x<y1.

Additional glass modifiers can be added as additional fluxing agents and/or stabilizing modifiers to enhance physical and/or chemical durability and to resist water and/or devitrification. For a reactive acidic glass component containing glass formers, phosphorus and boron, a glass network modifier (A") and an alkali metal flux (A'), the generalized formula is:

$$(A'_2O)_x(P_2O_5)_{y1}(B_2O_3)_{y2}(A''O)_z$$

where A' is an alkali metal fluxing agent, A"O is a metallic glass modifiers, x ranges from about 0.050–0.500, $y_1$ ranges from about 0.030–0.800, y2 ranges from about 0.010–0.150, z is between about 0.010 and 0.300, $x+y_1+y_2+z=1$ and $x<y_1$.

So, if A"=Mg, then the formula would be $$(A''_2O)_x(P_2O_5)_{y1}(B_2O_3)_{y2}(MgO)_z$$

where A' is an alkali metal fluxing agent, x ranges from about 0.050–0.500, $y_1$ ranges from about 0.030–0.800, $y_2$ ranges from about 0.010–0.150, z is between about 0.010 and 0.300, $x+y_1+y_2+z=1$ and $x<y_1$.

For a five-component reactive acidic glass component containing glass formers ($G_f$), phosphorus and boron; glass network modifiers (A"), magnesium and barium, and an alkali metal flux (A'), the generalized formula becomes:

$$(A'_2O)_x(P2O_5)_{y1}(B_2O_3)_{y2}(MgO)_{z1}(BaO)_{z2}$$

where A' is an alkali metal fluxing agent, x ranges from about 0.050–0.500, $y_1$ ranges from about 0.030–0.800, $y_2$ ranges from about 0.010–0.150, $z_1$ ranges from about 0.010–0.200, and $z_2$ ranges from about 0.010–0.200, $x+y_1+y_2+z_1+z_2=1$ and $x<y_1$ For a five-component reactive glass component containing phosphorus, lithium, boron, magnesium and barium, the generalized formula is:

$$(Li_2O)_x(P_2O_5)_{y1}(B_2O_3)_{y2}(MgO)_{z1}(BaO)_{z2}$$

where x ranges from about 0.050–0.500, $y_1$ ranges from about 0.030–0.800, $y_2$ ranges from about 0.010–0.150, $z_1$ ranges from about 0.010–0.200, and $z_2$ ranges from about 0.010–0.200, $x+y_1+y_2+z_1+z_2=1$ and $x<y_1$ Of course, three, four, five, etc. component glass formulations can be made by substituting different glass formers, such as boron, silicon, phosphorus, sulfur, germanium, arsenic, antimony, aluminum, and vanadium, as well as different fluxing agents and glass network modifiers. This would result in different glass formulations than the borosilicate glasses used as examples.

The chemical and physical properties of the phosphate glass are determined by the initial formulation, the composition of the individual glass components, refining, annealing and aging conditions. The properties of the glass desired for this invention include an acidic formulation, durability, hydrolytic stability, reactivity and plasticity. The type and ratio of the glass components dictate these properties. For instance, a very reactive yet durable glass can be prepared using $NH_4H_2PO_4$, $Li_2CO_3$, $B(OH)_3$ and $MgCO_3$. The molar ratio of $[P_2O_5]$:$[Li_2O]$ must be greater than 1 to yield an acidic formulation. The addition of $B_2O_3$ (from $B(OH)_3$) enhances the durability of the phosphate glass while the selection of $Li_2O$ (from $Li_2CO_3$) and MgO (from $MgCO_3$) reduce water sensitivity. In part, the variation of the molar ratios of all three components govern acidity, durability, hydrolytic stability, the glass softening temperature ($T_s$), the glass melting temperature ($T_m$) and the glass transition temperature ($T_g$) of the glass. The refining time and temperature of the glass also influences its physical and mechanical characteristics. For a constant composition increasing the refining temperature and/or time further densifies the glass network raising the $T_g$, $T_s$ and $T_m$, reducing network activity and the hydroxyl/$H_2O$ content of the glass while enhancing durability. Thus by varying the glass composition, the glass refining time and temperature, various glass formulations can differ greatly with regard to reactivity, durability, acidity, hydrolytic stability, toughness and processing. Modest levels of silica and/or alumina may be optionally added to limit furnace contamination and/or strengthen the glass network if needed for very high temperature resistance (>900° C.). The matching, blending and adjustment of the glass and the alkali silicate properties allows the formulation of a high-temperature material with unique and novel properties. In other words, the ability to vary these "building blocks" enables one to tailor product properties to suit numerous high-temperature applications.

The particle size of the reactive glass, as is the particle size of the additional ingredients, is important, but not critical. Obviously, the finer the particle size the more reactive are the materials, and if the particles are too fine then the materials may be too reactive, and so, adjustments need to be made in the components employed to make the compositions of the present invention.

The matrix composite material system of the present invention addresses the pH issue by adding an acidic inorganic component (i.e., a reactive glass powder) to an alkali silicate solution. The alkali silicate solutions rely on their high pH to advance the reaction and neutralizing the pH can negatively affect the curing process. The addition of a reactive glass to the alkali silicate component reduces the pH level as the composite is cured, ultimately yielding a near neutral (pH 6–8) cured matrix. This reduces the damage to the glass reinforcement. The cured binder of the present invention contains multiple interacting inorganic networks, some being amorphous and others being crystalline, based upon the cure conditions. The combination of multiple networks provides enhanced thermal resistance, controlled chemical reactivity and resistance and reduced water content.

Additional components such as fillers, other network forming materials and modifiers can be incorporated as needed. These include additives and fillers typically used or known to ones skilled in the art. A polymer compound whether inorganic, organic or hybrid can include many additives or fillers to permit processing, fabrication and enhanced performance in service. Traditional fillers include kaolin, metakaolin, montmorillonites as well as other smectites and other clay or mineral fillers. Modifiers can include crosslinkers and gel inhibitors/promoters such as mineral acids, organic acids and bases. The modified alkali silicate composition that is obtained can be cured at relatively low temperatures (<200° C.), and at low pressures (<200 psi) to produce a inorganic polymer network having dimensional stability to 1000° C. and higher. However, it is not restricted to the lower temperature or pressure, and if needed, or desired, properties can be further enhanced utilizing elevated processing temperatures (up to 1000° C. and above) and pressures (up to 20,000+psi), or performing post-cure heat treatments.

The optional additives can be a compounds such as network formers, secondary network linking units, clay fillers, oxide fillers, gel modifiers, surface-active agents, organic toughening agents and/or plasticizing agents.

The network formers can be a compound such as borate, sulfate, aluminate, vanadate, boric acid, phosphoric acid, sulfuric acid, nitric acid, phosphorus pentoxide, sodium dihydrogen phosphate, disodium hydrogen phosphate, potassium hydrogen phosphate, ammonium hydrogen phosphate, other metallic and/or nonmetallic phosphate salts, germanate, or the like. The network former is present in an amount of between 0.0 wt. % and 20 wt. % based upon the total composition, with an amount of between 2 wt. % to about 5 wt. % being preferred.

The optional secondary network linking unit(s) are selected from Groups 2, 3, 4, 5, 11, 12, 13, 14, 15 and 16 of the Periodic Table and can be used in an amount of between 0.0 wt. % and about 10 wt. % based upon the total mixture, with the range of about 1 wt. % to about 3 wt. % being preferred. Multivalent cations of the Groups 6, 7, 8, 9, and 10, particularly Cr, Mo, W, Mn, Fe, Co, Ni, Pd, and Pt, also can be used. The optional secondary network-linking unit can be a multivalent cation useful for coordinating with oxo species such as the alkaline earths, main group metals, transition metal species, lanthanides and/or actinides and any useful combination thereof. Compounds such as $ZnCl_2$ can be incorporated to modify network density. Other network linkers can include multivalent cations derived from boron, aluminum, lead, zinc, gallium, cadmium, titanium, zirconium, lanthanum, cerium, neodymium, yttrium, magnesium, calcium, strontium and barium.

The optional clay filler is preferably calcined kaolin and can be used in an amount from zero to 10 wt. % based upon the weight of the total composition and if included in the formulation, 3 wt. % to 5 wt. % would be further preferred. The calcined kaolin may prove to be reactive with the silicate matrix material, although reactivity of the clay filler is not required and any of the commercially available clay fillers can be employed.

The optional oxide filler is preferably magnesium oxide (MgO) and can be used in an amount of zero % to 10% by weight based upon the total weight of the composition and if included in the formulation 1% to 6% by weight is preferred and 2% to 4% by weight further preferred.

The optional gel modifier is an organic acid or base generally selected from the group consisting of hydroxyacids and N-based and P-based bases. Preferably α-hydroxyacids, β-hydroxyacids, substituted pyridines and quinolines are used. These are utilized in an amount from none to 10 wt. % based upon the weight of the total composition, with 0.05 wt. % to 5 wt. % being further preferred if used in the formulation.

The optional surface-active agent is an anionic, cationic and/or a nonionic surfactant such as but not limited to alkylaryl sulfonates, silicones, quaternary ammonium salts, protonated organoamine salts or combinations thereof. These are utilized in an amount from none to 10 wt. % based upon the weight of the total composition, with 0.5 wt. % to 5 wt. % being further preferred if used in the formulation.

The optional organic toughening agents and/or plasticizing agents are organic-based toughening and/or plasticizing agent, or combinations thereof. These are utilized in an amount from none to 10 wt. % based upon the weight of the total composition.

The balance of the uncured composition is water and it will comprise about 10 wt. % to 75 wt. % based upon the total composition weight. The range of 15 wt. % to 40 wt. % is further preferred. The water can be introduced as part of one of the components, such as part of an alkali silicate solution, an alkaline earth salt solution or part of a phosphoric acid solution. Since the water incorporated in this invention can be viewed as a reaction medium, a reactant as well as a reaction product, the concentration of water can be difficult to quantify in general. The initial level of water in the starting mixture can vary from about 10 wt. % to about 70 wt. % while a B-staged prepreg may contain about 5 wt. % to about 35 wt. % water. A cured sample of the inorganic binder and/or composite can contain about 0 wt. % to about 10 wt. % water depending upon the processing conditions.

The reinforcing medium can be a material composed of reinforcing fibers, such as continuous or discontinuous fibers, which will be encapsulated in the matrix material. Reinforcing fibers may include glass fibers, carbon fibers, graphite fibers, metallic fibers, quartz fibers, ceramic fibers, basalt fibers, silicon carbide fibers, stainless steel fibers, titanium fibers, nickel alloy fibers, polymeric fibers, aramid fibers, alkaline resistant glass fibers and/or other fibers known to those knowledgeable in the arts. Reinforcing fibers may be in many forms, including yarns, tows, whiskers, continuous fibers, short fibers, woven fabrics, knitted fabrics, non-woven fabrics, random mats, felts, braided fabrics, wound tows, and/or other forms known to those knowledgeable in the arts.

The matrix compositions may incorporate a wide variety of organic and inorganic fillers commonly used by those knowledgeable in the art. The matrix may incorporate filler materials such as ceramic powders, mineral powders, silicon carbides, silicon nitrides, carbon, carbon black, molybdenum and its compounds, silicates, aluminum silicates, sodium aluminum silicates, potassium aluminum silicates or other inorganic fillers known to those knowledgeable in the arts. Organic materials are less preferred where the application is such that the organic materials will combust and produce gases. The filler materials also could be spheres, such as microspheres, macrospheres, hollow and/or solid spheres, and/or cylindrical, flat or irregularly shaped particles.

The inorganic matrix of the present invention influences the pH of the solution containing the alkali silicate backbone by incorporating an acidic inorganic component such as a reactive acidic network (e.g. an alkali borophosphate glass). The inorganic matrix binder cures via a condensation reaction partially driven by the elimination of water from the framework and if not removed excessive residual water in the binder leads to poor dimensional stability, poor physical properties and difficulty in processing.

The composite material can be shaped using any of the composite molding methods typically employed. The test specimen for this example was formed into a multi-layer composite by a traditional prepreg/lay-up method. A "prepreg" is formed by impregnating a reinforcing medium or reinforcement with the matrix binder to produce a binder coated fabric sheet. The next step is to layer the individual prepreg plies together to achieve the desired thickness and/or shape. Next, the "lay-up" is placed into a mold to compress and/or consolidate the prepreg and to form the composite shape. Optionally, the prepreg can be subjected to a B-staging period and/or vacuum bagging to reduce the water content. Finally, the composite is cured using the temperature and pressure necessary to consolidate the product.

The uncured composite may come in many forms, such as bulk molding compound, sheet molding compound, powder and reinforcement, liquid and reinforcement and prepreg.

As can be appreciated, the composites of the present invention may be processed by any method capable of applying temperature and/or pressure. Typical processes include compression molding, pultrusion (an automated process capable of producing a constant cross-section product), wet layup (a simple manual process for rapid prototypes and affordable low performance products), filament winding (an automated process for bodies of revolution), autoclave vacuum bag processing (a typical process for high performance aerospace laminates), non-autoclave vacuum bag processing, vacuum infusion (a process for large thick high-performance parts), liquid resin, film infusion or powder infusion, resin transfer molding (a near net-shape molding process with excellent dimensional repeatability), extrusion (a process capable of producing constant cross-section non-structural short-fiber products), injection molding (an automated process capable of producing small non-structural short-fiber products), casting (a process for bulk non-structural products), spin casting (a process capable of producing high-quality tubing), trapped elastomer molding (a process capable of producing unusual shapes) and like processes.

These processes have several advantages compared to the curing/consolidation methods normally used in making high temperature inorganic polymers, namely ceramics and glasses. Ceramic and glass processing typically requires high temperature processing equipment (above 1000° C). The nature of the inorganic matrix formulation of the present invention allows composites to be processed with conventional equipment found in thousands of composites manufacturing facilities. These processes allow a more rapid throughput than typical ceramic processes and enables the easy manufacturing of larger parts than typical ceramic processes. The use of these processes allows high fiber volumes for structural integrity, which is superior to typical concrete processing.

Glass fiber reinforcement (including E-glass fibers, S-glass fibers, alkali resistant glass fibers, etc.) is the preferred reinforcing material and it allows several unique performance features. The composite materials using glass fiber reinforcement and the matrix binder of the present invention are affordable, non-combustible, thermally-stable (i.e., no substantial or <1.0% permanent dimensional change after 48 hours of exposure at 700° C.) composite materials with insulating qualities and structural qualities that can be processed at lower temperatures using typical processing equipment. Normal processing can be at relatively low temperatures (<200° C.) and low pressure (<200 psi). A cross-ply glass fiber laminate can be produced with thermal insulating qualities (e.g., thermal conductivity of nominally 1.4 W/m-K), electrical insulating qualities (no detectable electrical conductivity when measured with a standard ohm meter) and modest mechanical performance (flexural modulus up to 8 Msi, flexural strength up to 20+ksi, and ultimate flexural strains up to 1.3%). This combination of properties should be enabling technology for many applications.

Ceramic fiber reinforcement (including silicon carbide fibers) is another preferred reinforcement, especially for high temperature applications above 700° C. Although expensive, ceramic fibers maintain structural integrity well above 1000° C. Carbon fiber reinforcement is a preferred reinforcement where electrical conductivity, thermal conductivity, high strength and/or impact resistance is desired.

The following material properties and standardized tests are used to evaluate the performance of composites prepared with the inorganic matrix binders of the present invention: hydrolytic stability; flexural strength (ASTM D790-99), flexural modulus (ASTM D790-99), ultimate flexural strain (ASTM D790-99), specific gravity (ASTM D792), thermal dimensional stability, thermal conductivity (modified ASTM C 177), electrical conductivity; pH (of the resin solution, the neat resin and the composite structure) Differential Scanning Calorimetry (or DSC); combustibility, thermal conductivity (ASTM C177), electrical conductivity (ASTM D 257), voltage breakdown (ASTM D229), permittivity @ 1 MHz (ASTM D229), dissipation factor @ 1 MHz (ASTM D229), arc resistance (ASTM D229), Izod impact strength (lengthwise & crosswise) (ASTM D229), flammability (UL 94, ASTM E-1354), dielectric constant; temperature index (NEMA LI-6), tensile strength, modulus and ultimate strain (ASTM D 638), compression strength, modulus and ultimate strain (ASTM D 695), interlaminar shear strength (ASTM D3846), short beam shear strength (ASTM D2344) and compression after impact.

The formulations disclosed within the terms of the present invention may also comprise any additives and fillers commonly in usage with typical hydraulic binders. Furthermore, the use of the matrix binder is not solely limited to composites but can be used to form neat resin components, coatings and adhesives.

As can be appreciated, the present invention can be formulated to be non-combustible. This desirable safety feature differentiates the invention from most organic materials (such as plastics, wood, rubber, etc.), which tend to combust, generate smoke and/or toxic gases upon exposure to fire. Further, the present invention can be formulated to be a thermal insulator and/or an electrical insulator. This desirable feature differentiates compositions in accordance with the present invention from most metals (such as steel, aluminum, copper, etc.), which tend to be thermal conductors and electrical conductors.

The present invention can be formulated to perform at high temperatures (>1000° C.) with negligible permanent changes in dimensions. This desirable feature differentiates the invention from most organic materials (which tend to pyrolyze when exposed to temperatures above 500° C.), from most cements (which tend to spall above 300° C.) and from many metals (including aluminum), which tend to warp or melt at 700° C. As a further feature, the present invention can achieve high temperature performance (above 700° C.) while being processed at relatively low temperatures and low pressures (e.g. <200° C. and <200 psi). This feature is desirable because the ability to process at low temperatures and pressures allows the invention to be processed with more affordable equipment and manufacturing processes. This feature of the chemistry differentiates the present invention from most ceramics, glasses and metals, which generally require very high temperatures and/or high pressures to create a molded shape. (Of course, the invention also can be effectively processed at higher temperatures and pressures; we have processed the material above 10,000 psi and above 1500° C.).

In some instances, an application may require a thermal barrier to resist a flame and/or elevated temperatures for a single service cycle and then replaced or applications at reduced service temperatures which do not need to withstand extreme temperatures greater than 200° C. An organic-inorganic hybrid based on the present invention may be useful. The organic component may be monomeric, oligomeric or polymeric in nature and imparts additional toughness, plasticity and flexibility to the hybrid composition.

The present invention can be formulated to impregnate fibers to form a rigid composite material. This desirable feature differentiates the invention from most materials, because most rigid materials have not been processed as a low viscosity liquid capable of wetting fibers. Fiber reinforcements within a matrix material offer many benefits, including improved strength, stiffness, fracture toughness, fatigue strength and impact resistance. While fiber-reinforced composite materials are common in applications ranging from automotive fascia to F-22 aircraft structures, the vast majority of composite materials are made with organic matrix materials, which are combustible. Non-combustible composite materials, such as ceramic matrix composite materials and metal matrix composite materials, tend to be cost prohibitive (often more than $500 per pound) for most applications. The present invention can be processed at a much lower cost than most ceramic or metal matrix composite materials.

The present invention readily can be formulated to incorporate a wide variety of fillers to tailor the material performance to suit the specific application. These fillers, which may include hollow spheres, conductive fillers, friction additives or thermal additives, can be incorporated to modify physical properties including density, conductivity, coefficient of friction, thermal performance, etc. These desirable features differentiate the present invention from many materials, including many metals. Given these features, the present invention is suited for many applications, including fire barriers, heat shields, high-temperature insulators, high-temperature molds, friction products, tooling and structures in high temperature environments.

Cellular materials, such as foamed compositions, can be formed from the present invention that are nonflammable and useful for thermal management, fire protection and other high temperature applications. The capabilities of the present invention to withstand temperatures beyond 800° C. allows its use in applications that cannot be met by organic-based cellular materials, such as foamed materials, and/or its derivatives. Inorganic cellular materials, such as foamed compositions, made from carbon, glass or ceramic materials can resist similar temperatures but are costly limiting their use for large scale thermal management needs and/or cost sensitive applications. A cellular material, such as a foamed material, prepared from the present invention can also be molded into complex as well as simple shapes as required and/or specifically shaped using traditional machining equipment. A cellular material, such as a foamed composition, can be either structural (integral) or nonstructural and formed with or without the use of a foaming agent. A syntactic foamed material can also be prepared utilizing the present invention and the appropriate fillers such as microspheres, microballoons and/or microcapsules.

The following examples are illustrative of the present invention, and should not limit the scope of the invention.

Glass Preparation:

The following example will serve to illustrate the preparation of a reactive glass for use in accordance with the present invention. The borophosphate glass is prepared as follows (reactants shown in Table 1):

1) The ammonium monobasic phosphate, boric acid, magnesium oxide and lithium carbonate or their equivalents are combined, blended and ground as dry powders. If needed, a phosphate/boric acid or other masterbatch can be prepared and used to enhance consistency.

2) The blended mixture is transferred to an alumina crucible and placed in a muffle furnace. The mixture is dried at 150° C. for 1–3 hours and then further heated at 225–275° C. for 2–10 hours to initiate a low-temperature condensation reaction and minimize foaming at higher temperatures. After the mixture has partially condensed, the furnace temperature is raised to 700–900° C. for 0.5–5.0 hours. At completion of the refining step, the molten glass is poured onto a quench plate and allowed to cool. The glass is then broken into small pieces and ground to the desired particle size, noting that a very small particle size enhances the reactivity of the glass.

3) The glass can be post-treated thermally to limit irregularities in composition, morphology and reactivity.

TABLE 1

The initial formulations of the phosphate glasses described in Examples 1–5.

| Ingredient | Example 1 | Example 2 | Example 3 | Example 4 | Example 5 |
|---|---|---|---|---|---|
| $NH_4H_2PO_4$ | 90.40 | 132.86 | 148.94 | 126.53 | 88.83 |
| $B(OH)_3$ | 3.21 | 6.44 | 6.36 | 6.43 | 3.16 |
| $MgCO_3$ | 1.58 | 8.85 | 8.73 | 8.83 | 3.25 |
| $BaCO_3$ | — | 20.72 | 5.11 | 20.67 | — |
| $Li_2(CO_3)_2$ | 4.84 | 15.52 | 15.31 | 17.42 | 4.17 |
|  | (g) | (g) | (g) | (g) | (g) |
| Refining Conditions T(° C.) / t(min) | 250° C. / 4 hrs. 750° C. / 5 hrs. | 500° C. / 4 hrs. 900° C. / 4 hrs. | 500° C. / 2 hrs. 900° C. / 4 hrs. | 500° C. / 4 hrs. 900° C. / 4 hrs. | 110° C. / 3 hrs. 230° C. / 18 hrs. 715° C. / 1 hrs. |

The examples illustrate the preparation of the reactive glasses which will be used in examples 6–11, which follow. The glass is prepared by blending the ingredients shown in Table 1. The blended mixture is put into alumina crucibles and placed in a muffle furnace at the conditions given in the table. The molten glass in poured onto a quench plate and allowed to cool. The glass is then ground to the desired particle size.

EXAMPLE 6

A portion of Kasil-1 (9.0 g) is transferred to a 50 mL beaker and slightly diluted by adding a small amount of water (1.0 g). The beaker is stirred and allowed to cool to ambient temperature. Next the phosphate glass prepared according to Example 1 is added slowly to the stirred potassium silicate solution. After this addition is completed, calcined kaolin, metakaolin or kaolin powder (1.0 g) is added with high-shear mixing. The mixture is allowed to set until the viscosity comes to a level (approximately 150 centipoise) suitable for application to the reinforcement medium (fabric, chopped fiber, wound filament, etc.) needed to construct the composite. If a neat sample is required, the amount of water used can be reduced. The composite material can be prepared using any of the composite molding methods typically employed, the test specimen for this example was formed into a composite by a traditional prepreg/lay-up method. A "prepreg" is formed by impregnating a reinforcing medium or reinforcement with the matrix binder to produce a binder coated fabric sheet. The next step is to layer the individual prepregs together to achieve the desired thickness and/or shape. Next, the "lay-up" is placed into a mold to compact or consolidate the prepregs and to form the composite shape. Optionally, the prepregs could be subjected to a B-staging period and/or vacuum bagging to reduce the water content.

Fiberglass composite panels were made using this formulation and compression molded using standard composite processing parameters: curing at 200 psi and 80° C. for 3 hours, 110° C. for 3 hours and 150° C. for 3 hours.

EXAMPLE 7

Potassium hydroxide (52.2 g) is dissolved in water (148.2 g) by stirring. This dissolution is exothermic requiring cooling (refrigerating to approximately 5° C.) before adding the remaining ingredients. The silica fume (301.2 g) is then added to the chilled solution slowly using high shear, continually monitoring the temperature. This mixture is allowed to stir for approximately 5 minutes before adding lactic acid (9 gms) after which it is allowed to stir for an additional 5 minutes. The glass (75 g), made in example 2, is suspended in water (20.1 g) and slowly added using high shear to the mixture. Finally, calcined kaolin (28.2 g) then magnesium oxide (28.2 g) are added using high shear mixing. The mixture is stirred for an additional 10 minutes resulting in a material with a viscosity of approximately 2500 cp. Prepreg is made from combining this material with a reinforcing fabric. Impregnation and curing process is described in Example 12.

EXAMPLE 8

Potassium hydroxide (43.5 g) is dissolved in water (123.5 g) by stirring. This dissolution is exothermic requiring cooling (refrigerating to approximately 5° C.) before adding the remaining ingredients. Tamsil 8 (200.8 g) and silica gel (50.2 g) are then added to the chilled solution slowly using high shear, continually monitoring the temperature. The glass (125 g) made in example 3 is suspended in water (33.5 g) and added slowly to the mixture using high shear mixing. Finally, calcined kaolin (23.5 g) then magnesium oxide (23.5 g) are added using high shear mixing. The mixture is stirred for an additional 10 minutes resulting in a material with a viscosity of approximately 2500 cp. Prepreg is made from combining this material with a reinforcing fabric. Impregnation and curing process is described in Example 13.

EXAMPLE 9

Silica fume (5.2 g) is added to Kasil 1 (130.0 g) and stirred for 10 minutes. The glass (80.0 g) made in example 4 is suspended in water (30.0 g) and added to the mixture slowly using a high shear mixer. Calcined kaolin (7.5 g) and magnesium oxide (7.5 g) are then slowly added separately using high shear mixing. The mixture is then stirred for an additional 10 minutes resulting in a low viscosity (approximately 150 cp) mixture. Prepreg is made from combining this material with a reinforcing fabric. Impregnation and curing process is described in Example 14.

EXAMPLE 10

Potassium hydroxide (10.0 g) is dissolved in water (70.0 g) by stirring. The silica fume (30.0 g) is then added to the solution slowly with high shear mixing. The glass (80.0 g) made in example 5 is suspended in water (30.0 g) and added slowly to the mixture with vigorous stirring. Finally, calcined kaolin (7.5 g) then magnesium oxide (7.5) are added using high shear mixing. The mixture is stirred for an additional 30 minutes resulting in a material with a viscosity of approximately 100 cp. Prepreg is made from combining this material with a reinforcing fabric. Impregnation and curing process is described in Example 15.

EXAMPLE 11

Potassium hydroxide (10.0 g) is dissolved in water (100.0 g) with stirring and allowed to cool. The silica fume (30.0 g) is then added to the solution slowly with high shear stirring. After mixing for approximately 20 minutes the mixture is poured into flat dish, creating a liquid layer approximately 0.25" thick, and allowed to dry for 3 days. The dry material is then milled to fine powder. A second powder is made by blending the glass powder (80.0 g) made in Example 5 with calcined kaolin (7.5 g) and magnesium oxide (7.5 g). The two powders are then blended together to be used in molding and/or prepreg techniques. Impregnation and curing process is described in Example 16.

EXAMPLE 12

The resin formulation made in Example 7 is poured into a lab prepreg apparatus consisting of a resin bath and squeeze roll. The glass fabric, S2-Glass 6781, is fed through the bath and squeeze rolls impregnating the fabric with the resin formulation. The prepreg is then allowed to stage at room temperature for 30 minutes at which time the resin will not transfer when touched. The staged prepreg is cut into plies and layered on a metal plate. The lay-up is then vacuum bagged and a vacuum of 28 inches is pulled on the part for 2 hours. After 2 hours at room temperature the part is put into the press at 80 C. and 200 psi for 3 hrs completing the cure cycle (refer to Table 2 for flexural properties).

EXAMPLE 13

The resin formulation made in Example 8 is impregnated into the glass fabric, S2-Glass 6781, manually using a plastic spool. The prepreg is staged at room temperature for 30 minutes at which time the resin is slightly sticky. The staged prepreg is cut into plies and layered on a metal plate. The lay-up is then vacuum bagged and a vacuum of 28 inches is pulled on the part for 2 hours. After 2 hours at room temperature the part is put into the press at 80° C. and 200 psi for 4 hrs., 110° C. and 200 psi for 2 hrs. and 150° C. and 200 psi for 2 hrs. (refer to Table 2 for flexural properties).

EXAMPLE 14

The resin formulation made in Example 9 is poured into a lab prepreg apparatus consisting of a resin bath and squeeze rolls. The glass fabric, E-Glass 7781, is fed through the bath and squeeze rolls impregnating the fabric with the resin formulation. The prepreg is then allowed to stage at room temperature overnight at which time the resin becomes dry to the touch. The staged prepreg is cut into plies and inserted into a mold. The mold is then put into the press and cure at 85° C. and 200 psi for 2 hrs., 110° C. and 200 psi for 1 hr., and 175° C. and 200 psi for 2 hrs. (refer to Table 2 for flexural properties).

EXAMPLE 15

The resin formulation made in Example 10 is poured into a lab prepreg apparatus consisting of a resin bath and squeeze rolls. The glass fabric, E-Glass 7781, is fed through the bath and squeeze rolls impregnating the fabric with the resin formulation. The prepreg is then allowed to stage at room temperature overnight at which time the resin becomes dry to the touch. The staged prepreg is cut into plies and inserted into a mold. The mold is then put into the press and cured at 120° C. and 200 psi for 1 hr. and 175° C. and 200 psi for 4 hrs. (refer to Table 2 for flexural properties).

EXAMPLE 16

The powdered material made in Example 11 is spread into a thin layer over a single ply of glass, the weight of the glass ply and powder are approximately equal. This same process is repeated for multiple plies then stacked into a laminate consisting of glass ply/powder/glass ply/powder. The laminate is inserted into a mold and press cured at 120° C. and 200 psi for 1 hr. and 175° C. and 200 psi for 4 hrs. (refer to Table 2 for flexural properties).

TABLE 2

Flexural Properties of samples tested in Examples 12–16.

| Example | Flexural Strength (Ksi) | Flexural Modulus (Msi) | Ultimate Strain |
|---|---|---|---|
| 12 | 14.75 | 3.347 | 0.00564 |
| 13 | 11.40 | 4.295 | 0.00329 |
| 14 | 11.52 | 2.221 | 0.00280 |
| 15 | 10.42 | 3.300 | — |
| 16 | 10.97 | 2.745 | — |

EXAMPLE 17

Potassium hydroxide (16.51 g) is dissolved in Kasil-1 (165.02 g) by stirring. The mixture is chilled to 40 to 45 F. and silica fume (154.10 g) is then added to the solution slowly with high shear mixing. Surfactant (7.0 g) in water (7.0 g) is added to the chilled formulation with high shear mixing. The glass (93.75 g) made in example 5 is suspended in water (18.1 g) and added slowly to the mixture with vigorous stirring. Finally, calcined kaolin (16.12 g) then magnesium oxide (16.12 g) are added using high shear mixing. The mixture is stirred for an additional 30 minutes resulting in a material with a viscosity of approximately 1,000 cp. Prepreg is made from combining this material with a reinforcing fabric. Impregnation and curing process is described in Example 15.

Composites made in accordance with the present invention may be used in a wide variety of applications such as reinforced missile silo doors, ship decks, blast shields for aircraft carrier decks, hot gas filters, protective coatings, electrical panels and boxes (with and without EMI shielding), engine covers and heat shields where it would provide, advantageously, corrosion resistance, lifecycle cost savings and weight reduction. Another example would be reinforced insulator inserts for aircraft brakes. The insulator within each piston thermally isolates the friction head from the hydraulic system. Compared to conventional resins, which decompose below 450° C., the matrix binders of the present invention have much higher thermal stability (to above 800° C.), and in contrast to metals, the composite of the present invention has superior insulation performance. This protects the hydraulic system and can reduce the weight and/or associated costs. In comparison to ceramics, the composite of the present invention is tougher because due to the presence of the reinforcing fibers, but less expensive than ceramic matrix composites due to the materials and processes utilized.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. An inorganic matrix composition comprising the reaction product of an alkali silicate and/or alkali silicate precursors derived from alkali hydroxides or oxides and a silica source, a reactive glass, water, and optionally a clay and/or oxide filler.

2. The composition of claim 1, wherein the alkali silicate is selected from potassium silicate solutions and/or sodium silicate solutions.

3. The composition of claim 1, wherein the alkali silicate is crystalline and/or amorphous sodium silicate and/or potassium silicate.

4. The composition of claim 1 wherein the alkali silicate precursors are alkali hydroxides and/or oxides and a $SiO_2$ source.

5. The composition of claim 1 wherein the $SiO_2$ source is an amorphous or crystalline $SiO_2$ form, selected from the group consisting of silica, silica fume, microsilica, precipitated silica, sand, quartz, quartz flour, silica gels, fumed silica and colloidal silica.

6. The composition of claim 1 wherein the alkali hydroxide is selected from the group consisting of potassium hydroxide and sodium hydroxide.

7. The composition of claim 1 wherein the alkali silicate and/or alkali silicate precursors has a $SiO_2/A_2O$ ratio of about 2.0:1.0 to 20.0:1.0, where A is potassium and/or sodium.

8. The composition of claim 1, wherein said reactive glass is acidic and selected from the group of consisting of phosphate glasses, borate glasses and sulfate glasses.

9. The composition of claim 1, wherein the reactive glass is a phosphate glass.

10. The composition of claim 1, wherein the reactive glass is selected from the group consisting of ultraphosphate glasses, borophosphate glasses, silicophosphate glasses, aluminophosphate glasses and mixtures thereof.

11. The composition of claim 1, wherein the reactive glass is an alkali borophosphate glass.

12. The composition of claim 1, wherein the reactive glass is an acidic alkali borophosphate glass.

13. The composition of claim 1, wherein the glass comprises the following formula:

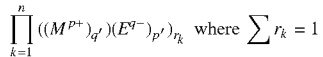

where M comprises at least one glass former and at least one metallic glass modifier, E is an oxygen, chalcogenide and/or a halogen atom, p is the cation valence of M, q is the anion valence of E, q' is number of M cations contained in a network unit, p' is number of E anions contained in a network unit, r is the molar fraction of that network unit, and n is the number of network units or building blocks and ranges from 2 to about 30.

14. The composition of claim 13 wherein the glass former is selected from the group consisting of boron, silicon, phosphorus, sulfur, germanium, arsenic, antimony, aluminum, and vanadium, and the metallic glass modifier is at least one composition which functions as a flux, selected from the group consisting of lithium, sodium, potassium, rubidium and cesium, and, optionally, a network modifier, selected from the group consisting of vanadium, aluminum, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, and cadmium.

15. The composition of claim 13 wherein E is selected from the group consisting of oxygen, chalcogenides, halogens, and mixtures thereof.

16. The composition of claim 13 wherein E is selected from the group consisting of oxygen, sulfur, selenium, tellurium, fluorine, and mixtures thereof.

17. The composition of claim 13 wherein M is at least one glass former selected from the group consisting of boron, silicon, phosphorus, sulfur, and at least one metallic glass modifier, selected from the group consisting of vanadium, titanium, zinc, lead, aluminum, zirconium, lanthanum, cerium, neodymium, magnesium, calcium, strontium, barium, lithium, sodium, potassium, rubidium and cesium atoms, and mixtures thereof, and E is an oxygen atom.

18. The composition of claim 1 wherein the reactive glass composition comprises the following formula:

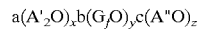

where A' represents at least one alkali metal glass modifiers, which functions as a fluxing agent, $G_f$ represents at least one glass formers, A" represents, optionally, at least one glass network modifier, a represents the number of fluxing agents present and ranges from 1 to 5, b represents the number of glass formers present and ranges from 1 to 10, c represents the number of glass network modifiers and ranges from 0 to about 30, x represents the mole fraction of fluxing agent and is between about 0.050 and about 0.150, y represents the mole fraction of glass former and is between about 0.200 and about 0.950, z represents the mole fraction of glass network modifiers and is between about 0.000 and about 0.500, x+y+z=1, and x<y.

19. The composition of claim 18 wherein A' is selected from the group consisting of lithium, sodium, potassium, rubidium, and cesium.

20. The composition of claim 18 wherein $G_f$ is selected from the group consisting of boron, silicon, phosphorus, sulfur, germanium, arsenic, antimony, aluminum and vanadium.

21. The composition of claim 18 wherein A"O is selected from the group consisting of vanadium oxide, titanium oxide, zinc oxide, lead oxide, aluminum oxide, zirconium oxide, lanthanum oxide, cerium oxide, neodymium oxide, magnesium oxide, calcium oxide, strontium oxide, barium oxide, and silicon oxide.

22. The composition of claim 18 wherein A"O is at least one metallic glass modifier.

23. The composition of claim 18 wherein A"O is at least two glass modifiers.

24. The composition of claim 18 wherein a is 1, b is 2, and c is 1.

25. The composition of claim 18 wherein a is 1, b is 2 and c is 2, and A' is Li, $G_fO$ is $P_2O_5$ and $B_2O_3$, and A"O is MgO and BaO.

26. The composition of claim 1 wherein the reactive glass composition comprises the following formula:

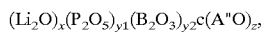

$(Li_2O)_x(P_2O_5)_{y1}(B_2O_3)_{y2}c(A"O)_z$, wherein A"O is at least one metallic glass modifiers, c is between 1 and 30, x is between about 0.050 and 0.500, $y_1$ is between about 0.200 and 0.800, $y_2$ is between about 0.010 and 0.150, z is between about 0.010 and 0.300, and $x+y_1+y_2+z=1$.

27. The composition of claim 18 wherein A"O is selected from the group consisting of magnesium oxide, barium oxide, zinc oxide, silicon oxide, and aluminum oxide.

28. The composition of claim 1, wherein the filler comprises at least one oxide selected from the group consisting of oxides of boron, aluminum, silicon, zinc, gallium, titanium, zirconium, manganese, iron, molybdenum, tungsten, bismuth, lead, lanthanum, cerium, neodymium, yttrium, calcium, magnesium and barium.

29. The composition of claim 1 wherein the clay filler comprises kaolin, calcined kaolin, mica, vermiculite and/or metakaolin.

30. The composition of claim 1, wherein said alkali silicate and/or alkali silicate precursors are present in an amount between about 30 wt. % and 90 wt. % based upon the total composition.

31. The composition of claim 1, wherein said alkali silicate is formed from a alkali hydroxide and a $SiO_2$ source and said alkali hydroxide is present in an amount of between about 3 wt. % to about 40 wt. % and said $SiO_2$ source is present in an amount of about 15 wt. % to about 75 wt. % based upon the total composition weight.

32. The composition of claim 1, wherein said reactive glass is present in an amount of between about 0.01 wt. % and about 60 wt. % based upon the total composition.

33. The composition of claim 8, wherein said reactive acidic glass is present in an amount of between about 0.01 wt. % and about 60 wt. % based upon the total composition.

34. The composition of claim 1, wherein said reactive glass is present in an G:$SiO_2$ ratio of between about 0.01 and about 50.0.

35. The composition of claim 8, wherein said reactive acidic glass is present in an G:$SiO_2$ ratio of between about 0.01 and about 50.0.

36. The composition of claim 1, wherein said clay filler is present in an amount of between about 0.0 wt. % and about 20 wt. % based upon the total composition weight.

37. The composition of claim 1, wherein said oxide filler is present in an amount of between about 0.0 wt. % and about 20 wt. % based upon the total composition weight.

38. The composition of claim 1 comprises the reaction product of the following:
   a) 30 to 85 wt. % of at least one alkali silicate;
   b) 0.01 to 60 wt. % of at least one reactive glass;
   c) 0 to 20 wt. % of at least one clay filler;
   d) 0 to 20 wt. % of at least one oxide; and
   e) 15 to 60 wt. % of water.

39. The composition of claim 1 comprises the reaction product of the following:
   a) 30 to 85 wt. % of at least one silicate or alkali silicate precursor;
   b) 0.01 to 60 wt. % of at least one reactive glass;
   c) 0 to 20 wt. % of at least one clay filler;
   d) 0 to 20 wt. % of at least one oxide; and
   e) 15 to 60 wt. % of water.

40. The composition of claim 1 comprises the reaction product of the following:
   a) 15 to 75 wt. % of at least one $SiO_2$ source;
   b) 3 to 40 wt. % of at least one alkali hydroxide;
   c) 0.01 to 60 wt. % of at least one reactive glass;
   d) 0 to 20 wt. % of at least one clay filler;
   e) 0 to 20 wt. % of at least one oxide; and
   f) 15 to 75 wt. % of water.

41. A composition comprising the reaction product of water and the following mixture:
   a) 20 to 99.9 wt. % of at least one alkali silicate;
   b) 0.01 to 80 wt. % of at least one reactive glass;
   c) 0 to 20 wt. % of at least one clay filler; and
   d) 0 to 20 wt. % of at least one oxide.

42. A composition comprising the reaction product of water and the following mixture:
   a) 20 to 99.9 wt. % of at least one alkali silicate or alkali silicate precursor;
   b) 0.01 to 80 wt. % of at least one reactive glass;
   c) 0 to 20 wt. % of at least one clay filler; and
   d) 0 to 20 wt. % of at least one oxide.

43. A composition comprising the reaction product of water and the following mixture:
   a) 20 to 75 wt. % of at least one $SiO_2$ source;
   b) 5 to 40 wt. % of at least one alkali hydroxide;
   c) 0.01 to 75 wt. % of at least one reactive glass;
   d) 0 to 20 wt. % of at least one clay filler; and
   e) 0 to 20 wt. % of at least one oxide.

44. The composition of claim 1 further includes non-clay filler materials.

45. The composition of claim 44, wherein the non-clay filler materials are selected from the group consisting of fibers, spheres, and particles.

46. The composition of claim 45, wherein the fibers are selected from a group consisting of continuous fibers and discontinuous fibers.

47. The composition of claim 45, wherein the spheres are selected from the group consisting of microspheres, macrospheres, hollow spheres, and solid spheres comprising glass, ceramic, metal, mineral, organic or inorganic materials.

48. The composition of claim 45, wherein the filler materials are utilized for reinforcement and selected from the group consisting of carbon fibers, glass fibers, alkali resistant glass fibers, mineral fibers, organic fibers, ceramic fibers and metallic fibers.

49. The composition of claim 45, wherein the reinforcement materials are selected from the group consisting of graphite fibers, E-glass fibers, S-glass fibers, basalt fibers, stainless steel fibers, titanium fibers, nickel alloy fibers, aramid fibers, polyethylene fibers, silicon carbide fibers and boron nitride fibers.

50. The inorganic matrix composition made from the composition of claim 1 and formed by curing the composition at a temperature ranging from about 15° C. to 1000° C. and higher and a pressure range from vacuum at about ambient to $10^{-3}$ torr, and/or external pressure from ambient to about 20,000 psi.

51. The inorganic matrix composition of claim 50 formed by curing the composition at about 15° C. to about 200° C. and an external pressure from ambient to 200 psi and, alternatively, under vacuum at about ambient to $10^{-3}$ torr.

52. An alkali silicate slurry composition for forming an inorganic polymer network comprising an alkali silicate or a mixture that yields an insitu alkali silicate, a reactive acidic glass, water and operationally a modifier that moderates the gelation of matrix binder suspension and/or a clay and/or oxide filler to enhance physical and thermal properties.

53. The composition of claim 52, wherein the gel modifier is an organic acid or organic base.

54. The composition of claim 52, wherein said organic acid is an α-hydroxyacid and/or a β-hydroxyacid.

55. The composition of claim 52, wherein said organic base is substituted nitrogen organic base.

56. The composition of claim 52, wherein said organic base is a substituted pyridine.

57. The composition of claim 52, wherein said organic base is quinoline.

58. The composition of claim 52, wherein said gel modifier is present in an amount of between about 0.0 wt. % and about 10 wt. % based upon the total composition.

* * * * *

UNITED STATES PATENT AND TRADEMARK OFFICE
CERTIFICATE OF CORRECTION

| | |
|---|---|
| PATENT NO. | : 6,969,422 B2 |
| DATED | : November 29, 2005 |
| INVENTOR(S) | : Anthony M. Mazany, John W. Robinson and Craig L. Cartwright |

It is certified that error appears in the above-identified patent and that said Letters Patent is hereby corrected as shown below:

Column 23,
Line 18, "operationally" should be -- optionally --.

Signed and Sealed this

Seventh Day of February, 2006

JON W. DUDAS
*Director of the United States Patent and Trademark Office*